R. J. CALDWELL.
TIRE FOR ROAD VEHICLE WHEELS.
APPLICATION FILED JULY 6, 1909.
975,207.
Patented Nov. 8, 1910.
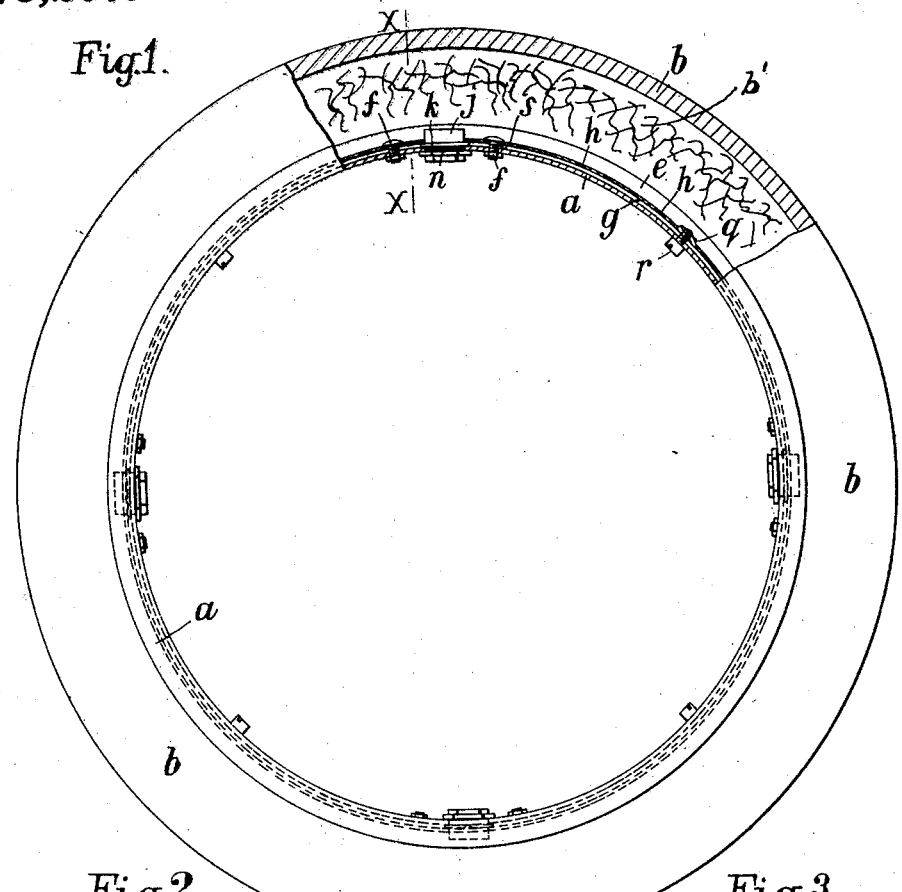
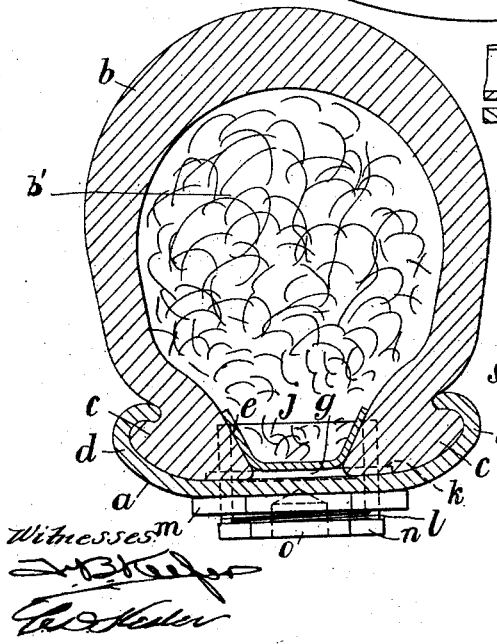
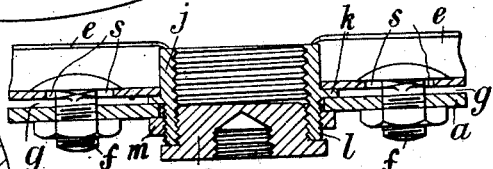
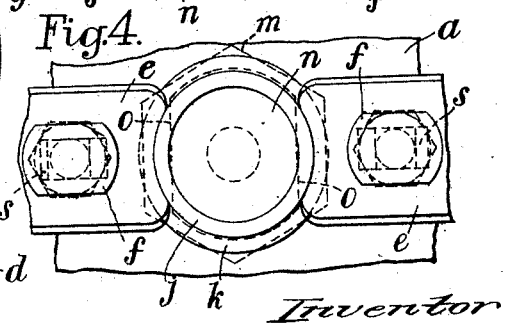
Inventor
Robert J. Caldwell

UNITED STATES PATENT OFFICE.

ROBERT JOHN CALDWELL, OF NEW SOUTHGATE, ENGLAND, ASSIGNOR, BY MESNE ASSIGNMENTS, TO PFLEUMATIC (1910) LIMITED, OF LONDON, ENGLAND.

TIRE FOR ROAD-VEHICLE WHEELS.

975,207.          Specification of Letters Patent.          Patented Nov. 8, 1910.

Application filed July 6, 1909. Serial No. 506,100.

*To all whom it may concern:*

Be it known that I, ROBERT JOHN CALDWELL, a subject of the King of Great Britain, residing at New Southgate, Middlesex, England, have invented new and useful Improvements in Tires for Road-Vehicle Wheels, of which the following is a specification.

This invention relates to road vehicle wheel tires, of the kind in which a tube or case of flexible or resilient material, such as canvas, india-rubber, or combined canvas and india-rubber, is filled with elastic cellular foamy or spongy material. Tires of this kind heretofore known have comprised complete tubes, which may have also served as the outer or tread portion of the tire, or may have been inclosed in a separate outer cover, within which the said foamy or spongy material is confined.

The object of the present invention is to provide means whereby the foamy or spongy material can be filled into and retained, without using a separate inner tube, in an outer cover or tire of the kind which has a divided base, that is to say an outer cover or tire of the kind which, by itself, is not a complete tube. Usually such outer covers are formed with two circumferential edges or borders which are enlarged or beaded to engage in channels in the wheel rim provided to receive the beaded edges. It has been found that, in filling the foamy or spongy material into such a tire, the said material works its way under or behind the beaded edges of the outer cover and forces the latter out of the channels in the wheel rim. In order to secure the beaded edges of the outer cover in the said channels, in the case of ordinary pneumatic tires, securing bands having a wedge-shaped cross-section have been employed to force the beaded edges apart and hold them in the rim channels, and, in other cases, thin circumferential tongues or flaps of material have been provided on the inside of the outer cover to lie over the division in the base or over the lines along which the inside edges of the outer cover rest against the metal rim, for the purpose of preventing a separate inner air tube inclosed by the outer cover from being nipped or pinched between the beaded edges of the cover and the rim. Arrangements of this kind, as heretofore constructed, although they are efficient for the particular purposes for which they are designed, are not applicable for use in tires filled with foamy or spongy material, especially since the said arrangements do not provide for the escape of air from inside the tire when being filled. The present invention comprises an arrangement in which such provision is made.

According to the present invention the beaded edges of the outer cover are held in the rim channels by a segmental band which is preferably trough-shaped in cross-section and is so proportioned that, in use, a space is left between the under or inner side of the band and the wheel rim to which the said band is conveniently secured by bolts, for example. This band is perforated to allow air to escape from within the outer cover held on the wheel rim thereby.

As is known, the foamy or spongy material is of such a nature that when being introduced into the tire, if it is introduced at one point only it cannot conveniently be forced right around the tire in such a manner that it will be equally distributed throughout the whole space inclosed between the outer cover and the wheel rim but it will be found to be more closely packed and under greater pressure at points near the admission aperture than at points remote therefrom. It is therefore advisable to provide more than one inlet aperture and these apertures are conveniently provided between the abutting ends of adjacent segments of the securing band hereinabove mentioned.

The present invention comprises a convenient form of nipple through which the filling material can be introduced into the tire, and a cap for closing the thoroughfare through the nipple after the tire is filled.

The streams or masses of foamy material flowing in opposite directions around the tire sometimes trap between them a bubble of air which has been unable to escape through the perforations provided for this purpose in the segmental securing band. To allow this bubble to be pricked if necessary, or in any case to allow this air to escape, a vent hole is provided through each segmental band midway between each adjacent pair of filling apertures. A plug is provided to close this vent hole the said plug being introduced through a hole in the wheel rim.

The perforations in the securing bands are only of small diameter and become choked or plugged by the foamy or spongy material. To draw off the air through the vent hole above referred to, which may also become choked by the foamy or spongy material, a hollow piercing tool is employed which while it is being thrust through the foamy or spongy material is filled by a rod which is withdrawn when the end of the tool is projecting into the air space, so that the air can escape through the tube.

The accompanying drawing shows how the said invention may be conveniently and advantageously carried into practice.

In this drawing:—Figure 1 is a side view of a tire, partly in central section, having my improvements applied thereto. Fig. 2 shows a section on the line $x$, $x$ Fig. 1, drawn to a larger scale. Figs. 3 and 4 are respectively a central section and a plan view of a filling nipple shown in its relation to the wheel rim and the tire securing bands.

As shown in this drawing, $a$ is a wheel rim, $b$ is an outer cover formed with a divided base and with beaded circumferential edges $c$ which are lodged in channels $d$ in the rim. A filling of foamy or spongy material is indicated at $b'$. These beaded edges are secured in the channels $d$ by a segmental trough-shaped securing band $e$ fastened to the rim by bolts $f$. This securing band is so proportioned that an annular air space $g$ is left between the rim and the band which is formed with perforations $h$. The band $e$ is drawn toward the rim by the bolts $f$ thus forcing the beaded edges $c$ of the cover into the channels $d$ and at the same time pressing the flaring sides of the band into the compressible material of the outer cover so that a tight joint is made and escape of the foamy or spongy filling material between the cover and the bands is prevented.

In the arrangement illustrated the band $e$ comprises four segments and a filling nipple $j$ is provided between the abutting ends of adjacent segments. Each nipple is provided with a shoulder or flange $k$ resting in the space $g$ between the wheel rim and the band, and is screw threaded externally at $l$ to receive a nut $m$ securing it to the wheel rim. The ends of the band segments are shaped to fit closely to the nipple which preferably extends a substantial distance into the space within the outer cover $b$. This arrangement minimizes if not entirely prevents escape of the foamy or spongy material into the space $g$ at the part thereof around the nipple, during the filling operation. The nipple is provided with interior screw threads and a cap $n$ screwing therein. A screw threaded hole is provided centrally in this cap to receive a handle by means of which the cap can be held and rotated to screw it into the nipple, the handle being released or removed by backward rotation while the cap is held against rotation by means of a spanner or like tool engaging flat surfaces $o$ provided for this purpose on the rim of the cap. A screw-threaded hole $q$ is provided in each band $e$ midway between the filling nipples $j$, and plugs $r$ are provided to close these holes which are accessible for the insertion of the plugs through holes provided for this purpose in the wheel rim. The plugs also assist in holding the segments on to the rim.

Before filling a tire of this kind the nipples $j$ are secured to the wheel rim. Then the segments of the band are first loosely attached to the rim $a$ by the plugs $r$ and bolts $f$ the holes $s$ in the bands through which the bolts pass being slotted to permit this. The outer cover $b$ is now put in position and the bolts $f$ and plugs $r$ are tightened to draw down the bands $e$ and force the edges $c$ of the cover into the channels $d$ and hold these edges therein. The caps $n$ are removed to permit the introduction of filling nozzles into the nipples $j$ through all of which the foamy or spongy filling material is now simultaneously forced into the tire. The entering streams of filling material sweep out the air from within the tire through the holes $h$ into the space $g$ from whence it readily escapes into the outer air and after the air has thus passed out a small amount of the filling material is exuded through the holes $h$ thereby choking or plugging the same. After this the plugs $r$ are removed and any air trapped in the tire between the meeting streams of filling material is drawn off by the use of a suitable tool such as that to which reference has already been made. After testing the evenness and sufficiency of the filling in any approved manner the filling nozzles are rapidly withdrawn, the caps $n$ are rapidly substituted therefor, and the tire is then ready for use.

The precise shape or configuration of the trough-shaped segmental securing band, as illustrated in the accompanying drawing is not an essential part of the present invention as it is obvious that the shape of this band can be somewhat varied. Also this band may comprise two or any other convenient number of segments, and two or any other convenient number of filling nipples may be provided.

I claim:—

1. In a tire, an outer cover having a divided base, a rim, a segmental securing band, filling nipples arranged between the segments of the band, flanges on said nipples lodged in an air space provided between said rim and securing band, and a filling of elastic cellular material introduced within said outer cover through said filling nipples.

2. In a tire, an outer cover having a divided base, a filling of elastic cellular material, means for introducing said filling within said outer cover, a segmental securing band having vent holes formed therein, and plugs for closing said vent holes.

3. In a tire, a rim, an outer cover having a divided base, a perforated segmental band securing said outer cover to said rim, a filling of elastic cellular material, filling nozzles for admitting said elastic cellular material extending a short distance within the space between said outer cover and said segmental band, plugs closing said filling nozzles, and plugs closing air vent holes provided in said segmental band.

ROBERT JOHN CALDWELL.

Witnesses:
 GEO. HARRISON,
 FRITZ PFLEUMER.